Patented Sept. 27, 1932

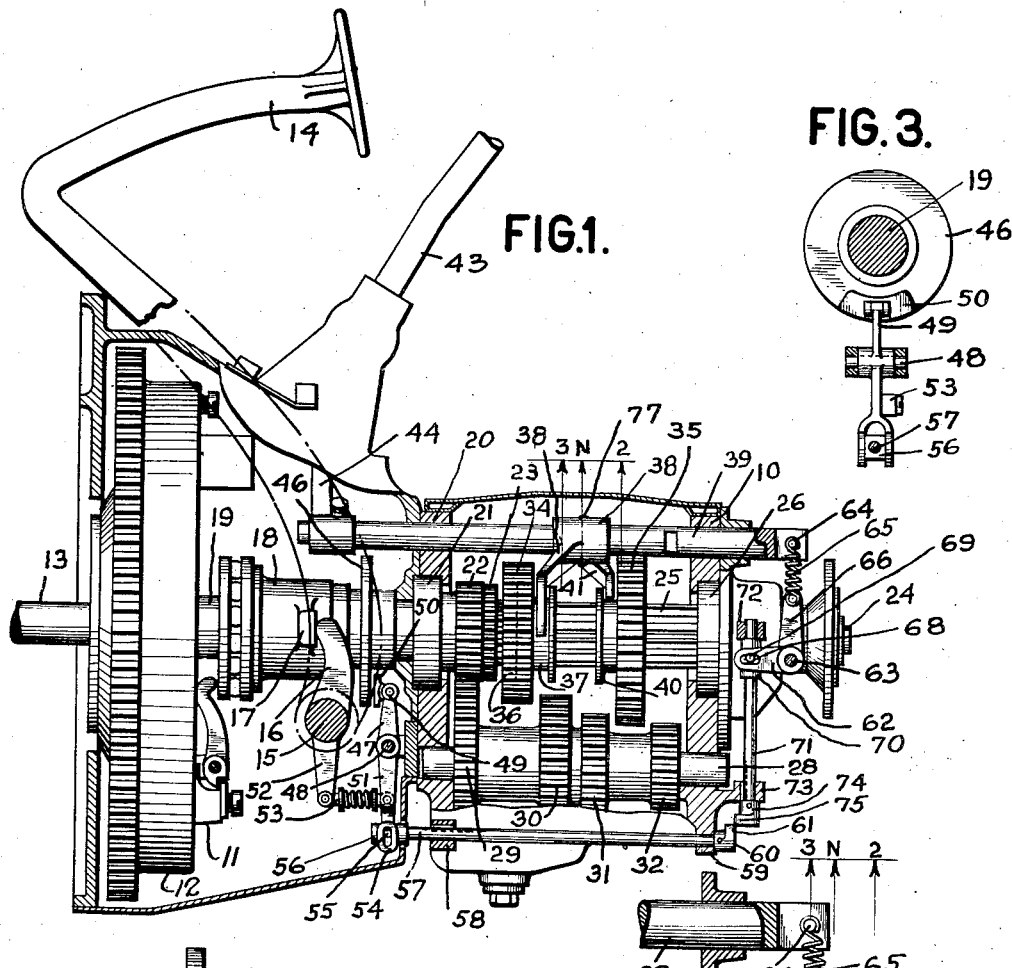

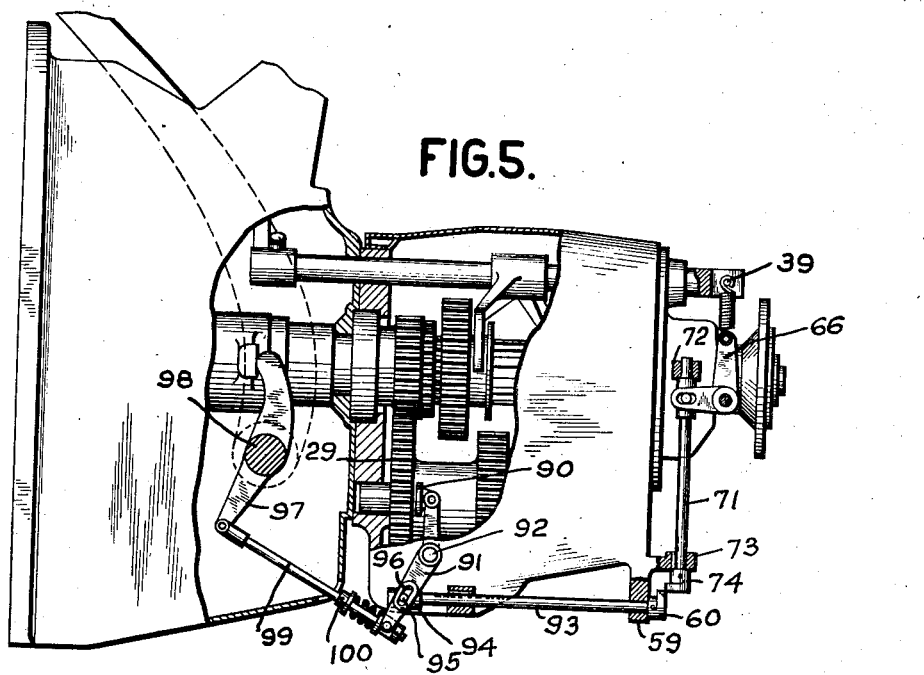
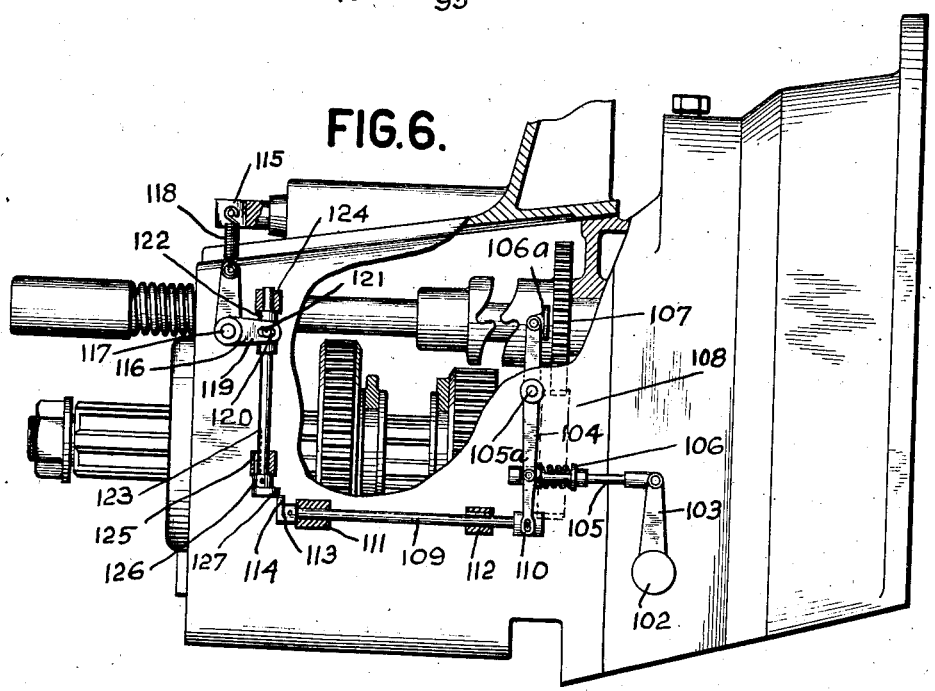

1,880,066

UNITED STATES PATENT OFFICE

WILLIAM BURNETTE BARNES, OF AUBURN, INDIANA, ASSIGNOR TO UNIVERSAL GEAR SHIFT CORPORATION, A CORPORATION OF DELAWARE

GEAR SHIFTING MECHANISM

Application filed November 6, 1930. Serial No. 493,719.

This invention pertains to transmissions and particularly to transmissions of the sliding gear type. The invention pertains more particularly to the elimination of the clashing of the gears when the gears are shifted selectively or progressively from one speed to the next, irrespective of whether or not the next speed is a higher or a lower one.

The invention will be described in connection with a type of transmission known generally as the selective type. However, it is understood that it is equally applicable to a progressive or any other type, and it is also understood that while the invention is particularly applicable to transmissions it may find use in many other instances where relatively similar peripheral speeds are desired before gears are placed in mesh.

Transmissions of the standard sliding gear type such as those used almost universally on automobiles have a driven clutch-shaft which is in end alignment with a splined shaft, the latter being connected to the differential through a universal joint and what is commonly called a drive-shaft. Parallel to and spaced from the driven clutch-shaft and the splined shaft is a jack-shaft. The jack-shaft is permanently geared to the driven clutch-shaft and is provided with a plurality of gears of different sizes which are adapted to mesh with selected gears slidably mounted upon the splined shaft.

For instance, in a transmission of the standard type having three forward speeds, the jack-shaft has a relatively small gear adapted to mesh with a relatively large gear on the splined shaft, and a medium sized gear adapted to mesh with a medium sized gear on the splined shaft. The medium sized gear on the splined shaft is also provided with means for direct connection with the driven clutch-shaft.

To place the transmission in low gear, or in other words in position for the first speed forward, the relatively large gear on the splined shaft is shifted into mesh with the relatively small gear on the jack-shaft. The jack-shaft has the motion imparted to it by the engine before the clutch was disengaged. The car is not in motion and therefore the relatively large gear on the splined shaft is not in motion. Consequently to bring the gears into mesh without any noise the jackshaft must be stopped. A braking action is therefore required for this purpose.

To place the transmission in intermediate, or in other words, to place the gears in position for the second speed forward, the medium sized gear on the splined shaft is brought into mesh with the medium sized gear on the jack-shaft. The medium sized gear on the splined shaft has the motion imparted to it by the movement of the car forward, whereas the medium sized gear on the jack-shaft has the motion imparted to it by the relatively large gear on the splined shaft through the relatively small gear on the jack-shaft prior to their disengagement. It is obvious that in this instance the peripheral speed of the medium sized gear on the jackshaft is much greater than that of the medium sized gear on the splined shaft. It is therefore necessary to reduce the peripheral speed of the medium sized gear on the jack-shaft to a value relatively similar to that of the peripheral speed of the medium sized gear on the splined shaft.

To place the transmission in high gear, or in other words, to place the mechanism in position for the third speed forward, the clutch members which are integral with the medium sized gear on the splined shaft are brought into engagement with corresponding members adjacent the end of the driven clutch-shaft. The speed of the driven clutchshaft in this instance is that imparted to it by the medium sized gear on the splined shaft prior to its disengagement with the medium sized gear on the jack-shaft. In view of the fact that the jack-shaft has a relatively large gear in mesh with a relatively small gear on the driven clutch-shaft, the driven clutchshaft is at this time rotating at a much higher speed than the splined shaft. To bring the clutch members into engagement without undue clashing, it is necessary to reduce the speed of the driven clutch-shaft to a value similar to that of the speed of the splined shaft.

Progressing in the other direction, that is from high gear to low gear, it will be found that to bring the medium sized gears into mesh for intermediate or second speed that a reduction in the speed of the medium sized gear on the jack-shaft is undesirable because this would increase the relative difference between the peripheral speeds of the two medium sized gears. When the high gear clutch members are engaged, the medium sized gear on the splined shaft has a greater peripheral speed than the medium sized gear on the jack-shaft. It is therefore obvious that the speed of the medium sized gear on the jack-shaft should not be further reduced.

Shifting from intermediate to low gear is very rare with present day automobiles. However, in a very large percentage of the cases when a shift of this character becomes necessary, the driver generally stops the car and proceeds forward the same as when the original start was made.

Certain devices, intended for the elimination of the clashing of gears, apply the same braking force irrespective of what type of change is to be made. For this reason shifting from high to intermediate is difficult and practically impossible without a clashing of gears, and the procedure in many cases is so unsatisfactory to the driver that he makes it a practice to stop the car and to proceed forward in low gear.

For the purposes of illustration, the invention will be described in connection with standard transmissions. However, it is understood that it may have many other applications.

In the drawings Figure 1 is an elevation, chiefly in section, of a standard transmission and associated mechanism having the invention applied thereto.

Figure 2 is an elevation, partly in section, of the mechanism for carrying out the invention, shown in a different position.

Figure 3 is a detail of the brake shoe shown in Figures 1 and 2, together with associated mechanism.

Figure 4 is an elevation, partly in section, illustrating a different position of the locking mechanism.

Figure 5 is an elevation, partly in section, illustrating a different form of the invention.

Figure 6 is an elevation, partly in section, showing the invention applied to a different type of transmission.

Referring to the form shown in Figures 1 to 4 inclusive, at 10 is shown a transmission of the ordinary type connected to a clutch mechanism illustrated generally at 11. The type of clutch employed, of course, is immaterial. The clutch shown is associated with the fly-wheel 12 mounted upon driven shaft 13 which is an extension of the crank shaft of the motor (not shown). The clutch is operated by means of a foot pedal 14 mounted on shaft 15 having a U-shaped member 16 which engages projections 17 on opposite sides of the sleeve 18 slidably mounted upon driven clutch-shaft 19. Clutch-shaft 19 has its rear end journaled in the front end of the gear case 20, as illustrated at 21, and is provided with a gear 22 having a reduced portion 23 on one face which acts as one member of the high gear clutch. Shaft 24 is disposed in end alignment with driven clutch-shaft 19 and is provided with a splined portion 25. The forward end of driven shaft 24 is generally journaled in the end of clutch-shaft 19. The rear end of the driven shaft 24 is generally journaled in the rear end of gear case 20 as illustrated at 26 and is adapted for connection to the differential through a universal joint and a so-called drive shaft (not shown).

Parallel to and spaced from clutch-shaft 19 and driven shaft 24 is a jack-shaft 28 having its ends journaled in gear case 20. The jack-shaft 28 is operatively connected to clutch-shaft 19 through gear 29 on jack-shaft 28 which meshes with gear 22. Jack-shaft 28 has a gear 30 of medium size and a gear 31 of relatively small size. The gear 32 on jack-shaft 28 meshes with an idler gear (not shown) which in turn is engaged by a sliding gear on shaft 24 for placing the transmission in reverse. This particular latter arrangement for reversing does not pertain to this invention and therefore further reference will not be made to it except to say that the invention herein also assists in shifting into reverse by braking the jack-shaft 28.

Mounted upon splined portion 25 of shaft 24 are medium sized gear 34 and relatively large gear 35. Medium sized gear 34 is provided with a depression in one face shown dotted at 36 which forms the other member of the high gear clutch and which is adapted to cooperate with the portion 23 to directly connect clutch-shaft 19 and driven shaft 24.

Gear 34 is provided with a grooved extension 37 which is engaged by a fork 38 mounted on slip rod 39 which is journaled in the gear case. Gear 35 is provided with an extension 40 having a groove which is engaged by fork 41 mounted upon a second slip rod (not shown) which lies parallel to slip rod 39 and directly back of same as seen in Figure 1. The slip rods are operated through gear shift lever 43 having an end 44 adapted for selective engagement with either slip rod.

All of the foregoing particular description of Figure 1 is purely illustrative in character and is of a standard type of transmission. It is given for the purposes of illustrating how applicant's invention may be applied thereto, and by analogy to any other type of transmission.

The invention herein relates to the regulation of the relative speed of corresponding parts of the transmission to be brought into mesh.

The braking force in applicant's invention may be applied at any point which is mechanically or otherwise connected to the gear to be controlled.

In the form shown in Figure 1 an annulus 46 is mounted on the driven clutch-shaft 19. A lever 47 fulcrumed at 48 has an end 49 bearing a brake shoe 50. The brake shoe 50 may be rigidly or pivotally mounted as desired. The other arm 51 of lever 47 is connected to arm 52 on shaft 15 by means of compressible member 53. The outer end of arm 51 is provided with a slot as shown at 54, into which protrudes a pin 55 on member 56 mounted on the end of shaft 57. Shaft 57 is adapted to slide but is prevented from turning in bearings 58 and 59 on gear case 20 by any suitable means. The other end of shaft 57 is provided with a collar 60 shown provided with a protuberance 61 which may be somewhat cam-shaped and smooth.

A bell crank lever 62 fulcrumed at 63 on gear case 20 is resiliently connected to the end of slip rod 39 as shown at 64 by means of a spring 65 which is connected to arm 66 of bell crank lever 62. The other arm 67 of bell crank lever 62 has a slot 68 into which projects a pin 69 on collar 70 mounted on rod 71 which is adapted to slide but is prevented from turning in bearings 72 and 73 on gear case 20 by any suitable means. The lower end of rod 71 is provided with a collar 74 having a cam-like protuberance 75.

The operation of the mechanism shown in Figures 1 to 4 inclusive is as follows: The transmission as shown in Figure 1 is in neutral and the center of pin 77 on fork 38 is shown on the line marked "N". To shift gear 35 into mesh with gear 31 to place the transmission in position for the first speed forward, fork 41 on the slip rod, not shown, is moved to the left. Prior to the movement of fork 41 the pedal 14 is depressed to disengage the clutch. The depression of the pedal 14 moves arm 52 on shaft 15 counter clockwise. The force applied to arm 52 is transmitted to arm 51 of lever 47 through the compressible member 53. With the slip rod 39 in the position shown, collar 74 does not project into the path of protuberance 61 on collar 60. The shaft 57 is therefore free to move to the right in Figure 1, thus permitting lever 47 to move counter clockwise and brake shoe 50 to engage annulus 46. The peripheral speed of gear 31 is thus either substantially decreased or brought to zero upon the disengagement of the clutch and before the gear 35 is shifted.

To place gear 34 in mesh with gear 30 for the second speed forward, the slip rod 39 is moved to the right in Figure 1 so that the center of pin 77 moves to the line marked "2". In this case the collar 74 still remains out of the path of collar 60 and the braking force is applied upon the disengagement of the clutch and prior to shifting to reduce the peripheral speed of the gear 30.

To place the parts in position for the third speed forward the gear 34 is shifted to the left in Figure 1 so as to interlock the members 23 and 36. The center of pin 77 then falls on line 3. In view of the fact that the slip rod 39 is to the extreme right at the time that the clutch is disengaged, the braking force is applied prior to the shifting of the gear 34 to decrease the speed of member 23.

The amount of braking force required in each instance is more or less constant and can be averaged by adjustment for the three forward speeds.

The manner in which the collar 60 slides under collar 74 is illustrated in Figure 4.

After the gears have been shifted for the third speed forward the parts occupy the positions shown in Figure 2 wherein bell crank 62 has been rotated slightly counter clockwise so as to bring the collar 74 into the path of collar 60 to prevent movement of the shaft 57 to the right. Now when a shift is made from the third speed forward to the second speed forward, upon depression of the foot pedal 14 the lever 47 does not move because it is locked in position by the collar 74 engaging the collar 60. The motion of arm 52 is absorbed in the compressible member 53.

As previously set forth, a shift from second speed forward to first speed forward is very rare. However, should this shift be made, the braking force will not be any greater than that ordinarily met with in prior art devices.

The compressible member 53 may be of any construction. That shown comprises a member 79 with a collar 80 pivotally connected to arm 52 and a member 81 with a collar 82 pivotally connected to the arm 51. An aperture 83 in member 79 is slidably engaged by a pin 84 on the member 81. A compression spring 85 is disposed between the collars 80 and 82. Any suitable means may be provided for adjusting the braking force, such as interchangeable springs etc. The operation of this construction is obvious.

It is of course obvious that any other means may be employed for applying the braking force progressively from zero to the third speed forward and for permitting the gears to spin when shifting from the third speed forward to the second speed forward.

In Figure 5 I show brake shoe 90 adapted to engage the gear 29. Brake shoe 90 is mounted on lever 91 fulcrumed at 92 and is controlled through rod 93 having a member 94 with a pin 95 which operates in a slot 96 in one end of lever 91. Lever 91 is connected to arm 97 on shaft 98 through rod 99 and compressible member 100.

The operation of the form shown in Figure 5 is similar to that of the form shown in Figures 1 to 4 inclusive.

In Figure 6 the invention is shown adapted to a transmission used with a well known type of front wheel drive. In this instance the clutch is ahead of the engine and the transmission is between the clutch and the front wheels.

At 102 is shown the shaft to which the clutch pedal is attached. An arm 103 secured to the shaft 102 is connected to lever 104 through a rod 105 and a compressible member 106. Lever 104 is fulcrumed at 105a and carries a brake shoe 106a adapted to contact the face of gear 107. Gear 107 is merely used for hand-starting purposes and meshes with gear 108 fixed to the end of the driven clutch-shaft, not shown. Gear 108 is the equivalent of gear 22 in Figure 1. Lever 104 is pivotally connected to rod 109 as shown at 110. Rod 109 is adapted to slide but not to turn in bearings 111 and 112. Rod 109 has a collar 113 at one end, having a cam-like protuberance 114.

Slip rod 115 is connected to bell crank 116 which is fulcrumed at 117 by means of a resilient member 118. Bell crank 116 has one arm 119 which has a slot 120 into which projects a pin 121 on collar 122 secured to shaft 123. Shaft 123 is adapted to slide but not to turn in bearings 124 and 125. The lower end of shaft 123 carries a collar 126 having a cam-like protuberance 127. The various cam-shaped protuberances on the various collars similar to collars 113 and 126 in all of the views are of course purely optional and provide a better sliding surface.

In the form shown in Figure 6 the slip rod 115 moves to the left to place the transmission in intermediate or second gear and moves to the right to place the transmission in high or third gear forward. In other respects the operation is analogous to that of the form shown in Figures 1 to 4 inclusive.

While the invention has been described in connection with transmissions of standard types, it is of course understood that it may be applied to any transmission or analogous mechanism without departing from the spirit of the invention. It is also obvious that connection may be made with the slip rod or slip rods at other points, or the movement of any other part of the shifting mechanism may be employed to permit the operation of the braking mechanism when proceeding from zero to the third speed forward and permit the gears to spin when proceeding from the third speed forward to the second speed forward. It is also obvious that the brake shoe may engage any part of the mechanically associated mechanism.

Having described my invention it is obvious that many modifications may be made in the same within the scope of the claims without departing from the spirit thereof.

I claim:

1. In combination with a transmission having gears adapted for shifting in and out of mesh, means for reducing the speed of one gear to reduce the relative difference between its peripheral speed and that of a second gear with which said first gear is to be placed in mesh when the shifting is progressing in one direction, and means to prevent the operation of said first mentioned means when the shifting is progressing in the opposite direction.

2. In combination with a transmission having gears adapted for shifting in and out of mesh, means for reducing the speed of a gear to reduce the relative difference between its peripheral speed and that of an associated gear prior to the meshing of said gears when the shifting is from a lower to a higher speed, and means to prevent the operation of said first mentioned means when the shifting is from a higher to a lower speed.

3. In combination with a transmission having a driven clutch-shaft and a set of gears operatively connected thereto and having means for selectively shifting gears of a second set in and out of mesh with said first set, of means for reducing the peripheral speed of a gear of said first set when a selected gear of said second set with which said gear of said first set is to be engaged has a lesser peripheral speed than said gear of said first set, and means for preventing the operation of said first mentioned means when said gear of said first set is travelling at a lesser speed.

4. In combination, a driven clutch-shaft having a jack-shaft geared thereto and having high gear clutching means, an intermediate gear having a cooperating high gear clutching means, a slip rod for shifting said gear, braking means for said driven clutch-shaft, means for operating said braking means when shifting from intermediate to high gear, and means for holding said braking means inoperative when shifting from high gear to intermediate.

5. In combination, a driven clutch-shaft having a jack-shaft geared thereto and having high gear clutching means, an intermediate gear having a cooperating high gear clutching means, a slip rod for shifting said gear, braking means for said jack-shaft, means for operating said braking means when shifting from intermediate to high gear, and means for holding said braking means inoperative when shifting from high gear to intermediate.

6. In combination, a driven clutch-shaft having a jack-shaft geared thereto and having high gear clutching means, an auxiliary gear in mesh with a gear on said clutch-shaft, an intermediate gear having a cooperating high gear clutching means, a slip rod for shifting said gear, braking means adapted to contact said auxiliary gear, means for operating said braking means when shifting from intermediate to high gear, and means for holding said braking means inoperative when shifting from high gear to intermediate.

7. In combination with a transmission having gears adapted for shifting in and out of mesh, means for reducing the speed of a gear when its peripheral speed is greater than that of an associated gear prior to meshing of said gears, and means to prevent the operation of said first mentioned means when prior to meshing of said gears said first mentioned gear has a peripheral speed which is not greater than that of said associated gear.

In testimony whereof, I have signed my name to this specification this 15th day of October, 1930.

WILLIAM BURNETTE BARNES.